United States Patent [19]
Blumer

[11] 3,889,468
[45] June 17, 1975

[54] POWER BOOSTER AND MASTER CYLINDER ASSEMBLY

[75] Inventor: Larry D. Blumer, Gaines, Mich.

[73] Assignee: General Motors Corporation, Detroit, Mich.

[22] Filed: Mar. 4, 1974

[21] Appl. No.: 447,737

[52] U.S. Cl............................ 60/548; 91/470
[51] Int. Cl............................... F15b 7/00
[58] Field of Search............ 60/548, 581; 91/391 R, 91/470

[56] References Cited
UNITED STATES PATENTS

| | | | |
|---|---|---|---|
| 2,282,472 | 5/1942 | Herman et al. | 60/581 X |
| 2,331,790 | 10/1943 | Nichols, Jr. | 91/470 X |
| 2,980,066 | 4/1961 | Stelzer et al. | 91/391 R X |
| 3,176,467 | 4/1965 | Van House | 60/548 |

FOREIGN PATENTS OR APPLICATIONS 679,713   1/1930   France.................................. 60/581

Primary Examiner—Martin P. Schwadron
Assistant Examiner—Harold Burks, Sr.
Attorney, Agent, or Firm—D. D. McGraw

[57] ABSTRACT

A vehicle brake system includes a power brake booster arrangement in which hydraulic pressure to operate the brake booster is controlled by a rotary valve. In normal operation the valve is moved by operation of a brake pedal through a connecting link, and another connecting link arrangement between the brake booster and the brake pedal operates to provide reaction. If there is a loss of hydraulic pressure for power operation, the reaction linkage operates to provide a manual drive for manual actuation of the master cylinder portion of the assembly.

3 Claims, 7 Drawing Figures

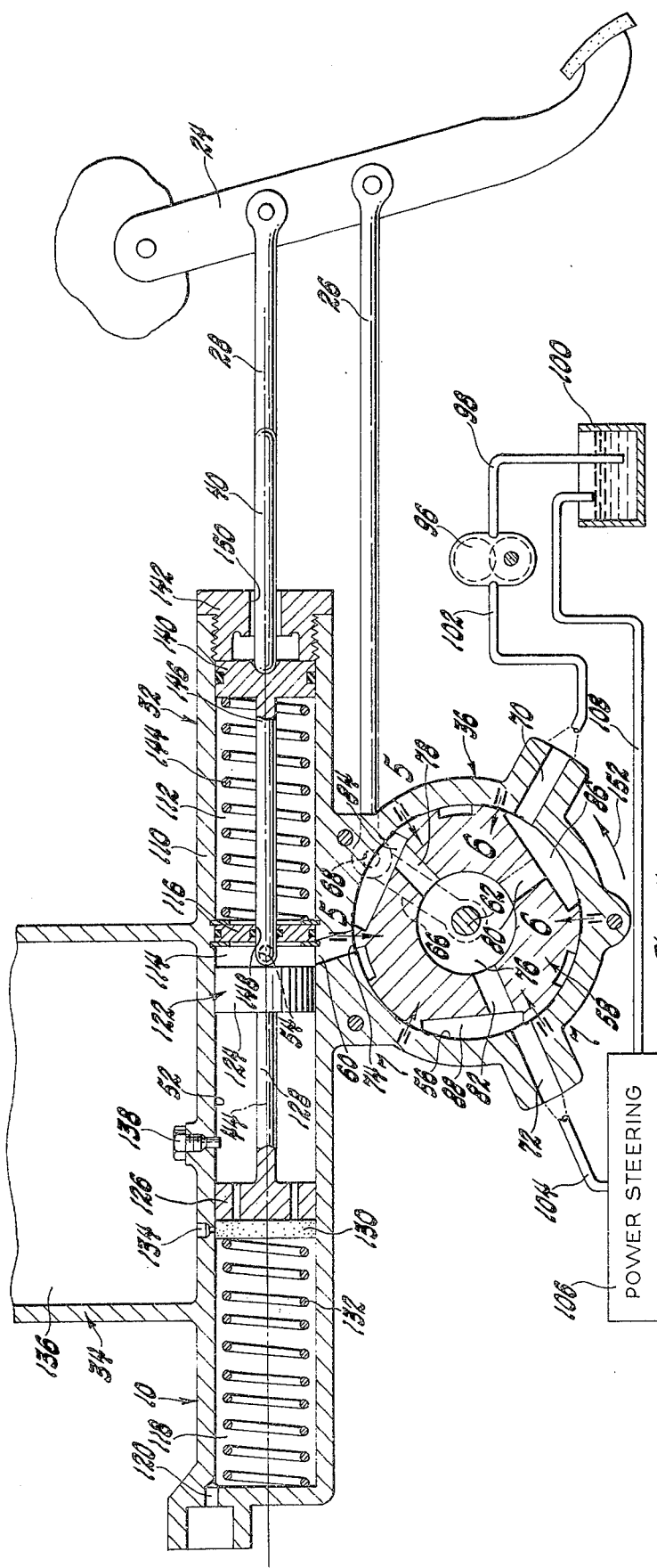

POWER BOOSTER AND MASTER CYLINDER ASSEMBLY

The invention relates to a power booster and master cylinder and more particularly to a rotary valve-controlled brake booster arrangement for use in operation of vehicle brakes. In the preferred embodiment illustrated the assembly includes a pair of parallel bores, each of which has a master cylinder pressurizing piston, a brake booster power piston, and reaction mechanism for transmitting proportional feel to the brake operator. A rotary valve is provided in a valve chamber and is arranged relative to the booster and master cylinder bores with its axis of rotation positioned underneath the bores and extending transversely relative to the bore axes. The assembly is connected to an operator-actuated brake pedal lever by two generally parallel push rod linkages. The linkage connecting the brake pedal lever to the rotary valve is pivotally attached to the brake pedal lever at a distance from the brake pedal lever pivot point which is greater than the distance from the brake pedal lever pivot point to the pivot point at which the other push rod linkage is connected to the brake pedal lever. This other linkage has parallel ends which extend into the parallel bores and engage reaction members which are subjected to hydraulic pressures in the booster power chambers. This arrangement also provides for manual operation of the master cylinder portions of the assembly when no power pressure is available.

The power pressure utilized to operate the brake booster section is preferably generated by a hydraulic pressure pump which also provides hydraulic pressure to operate other vehicle accessories such as the power steering gear. In the brake release position the rotary valve which controls the power booster section is so positioned that there is substantially free and unrestricted fluid flow through the valve to the power steering gear and there is no fluid circulation through the brake booster power chambers. When the brake is actuated, the valve is rotated so as to restrict the flow of power fluid out of the valve chamber and at the same time open a variable orifice connecting the valve chamber to the booster power chambers. Thus, by controlling the size of opening of both orifices by rotary valve motion, the amount of hydraulic booster pressure generated and applied to the booster power pistons is a function of brake pedal movement.

The reaction members extend into the power chambers and have relatively small areas exposed to the power pressure therein in relation to the effective operating areas of the power pistons. This generates a proportional force transmitted to the operator through the push rod linkage connected thereto. If there is no power pressure being generated, brake actuation is accomplished by the operator depressing the brake pedal to transmit force through the reaction members and their associated push rod linkage. The reaction members are mechanically engageable with the booster power pistons which in turn mechanically drive the master cylinder pressurizing pistons so that the brake circuits are pressurized without the use of power boost.

IN THE DRAWINGS:

FIG. 4 is a cross section view taken in the direction of arrows 4—4 of FIG. 1 and illustrates, with parts broken away, a section view of one of the master cylinder and booster bores and the valve and valve chamber of the mechanism of FIG. 1. The figure also schematically illustrates the fluid power circuit by which fluid boost pressure is provided.

FIG. 5 is a fragmentary section view taken in the direction of arrows 5—5 of FIG. 4 and illustrating a portion of the control orifice and passage system of the valve mechanism.

FIG. 6 is a fragmentary section view taken in the direction of arrows 6—6 of FIG. 4 and illustrating the inlet port and a portion of the passage system incorporated in the valve.

FIG. 7 is a fragmentary section view taken in the direction of arrows 7—7 of FIG. 4 and illustrates the valve chamber outlet port and a portion of the passage system of the valve.

Figure 1:
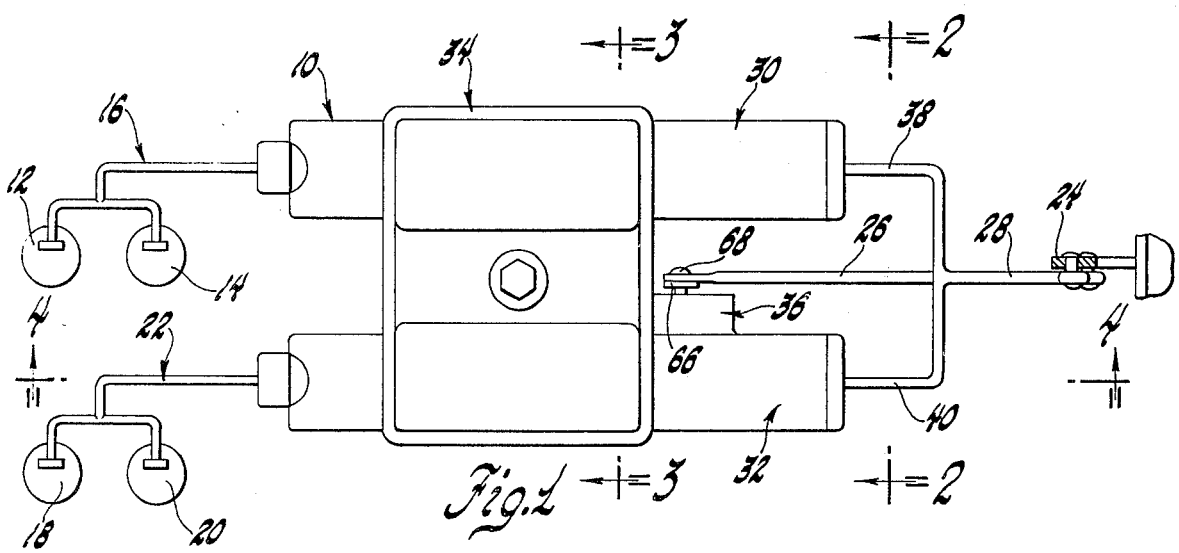
FIG. 1 is a plan view of a power booster and master cylinder assembly embodying the invention and schematically illustrated as being connected to operate a pair of vehicle brake circuits.

The system illustrated in FIG. 1 includes a brake booster and master cylinder assembly 10 which is connected to have one master cylinder section operate the brakes 12 and 14 of one vehicle brake circuit 16 and the other master cylinder section to operate brakes 18 and 20 of another vehicle brake circuit 22. The assembly 10 is pivotally connected to the brake pedal lever 24 by a valve push rod link 26 and a booster and master cylinder push rod link 28. The assembly 10 is illustrated as having parallel sections 30 and 32 joined by a reservoir section 34. The valve section 36 is positioned generally underneath and adjacent section 32 so that the push rod 26 extends along a direct line from the pedal arm 24 and, as seen in FIG. 1, substantially equidistant from the longitudinal axes of sections 30 and 32. The push rod link 28 is bifurcated to provide arms 38 and 40 which respectively extend along the axes of sections 30 and 32 and into those sections as will be later described.

Figures 2, 3:
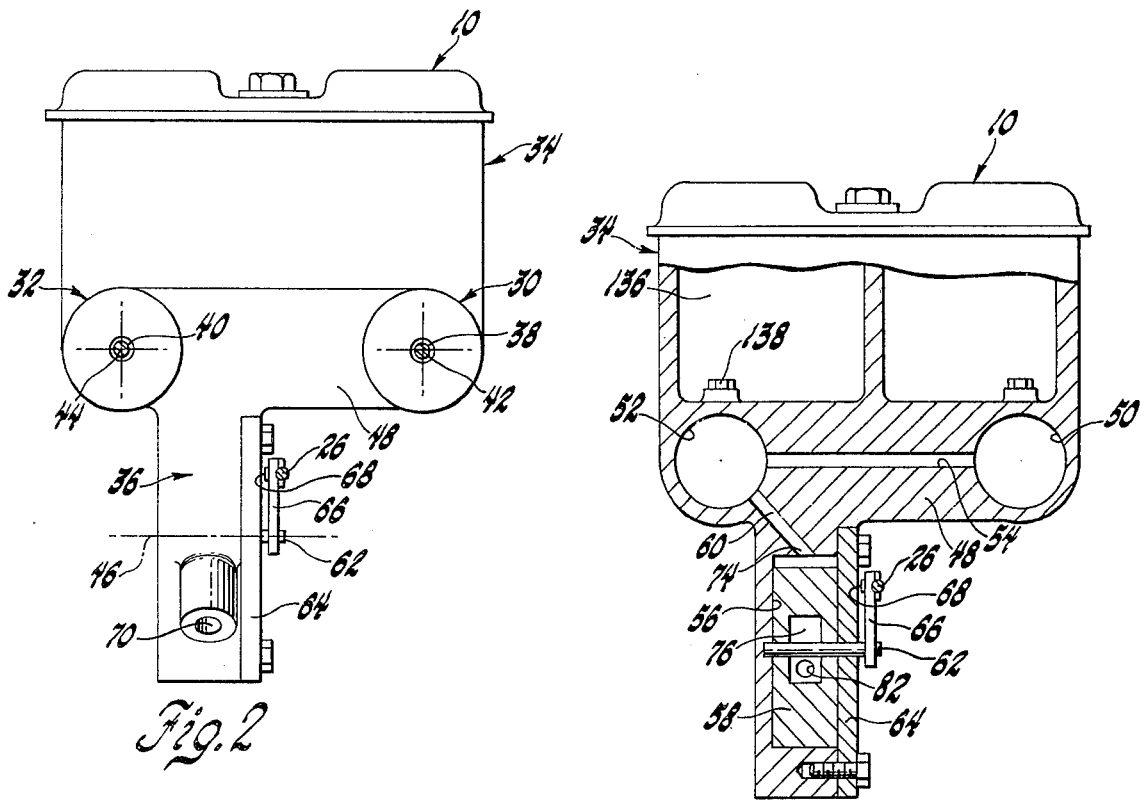
FIG. 2 is an end view of the assembly of FIG. 1, taken in the direction of arrows 2—2 of that figure, with parts in section.
FIG. 3 is a cross section view of the assembly of FIG. 1 taken in the direction of arrows 3—3 of the figure and having parts broken away and in section.

As seen in FIG. 2, the axis 42 of section 30 is parallel to and spaced from the axis 44 of section 32. The axis 46 of the valve section 36 is positioned underneath axes 42 and 44 and is transverse to those axes. It therefore is skew to those axes, and is preferably perpendicularly skew to them in the manner illustrated. The sections 30 and 32 are joined by a fillet 48 which also is the bottom of the reservoir section 34. Section 30 has an axially extending bore 50 and section 32 has an axially extending bore 52. As seen in FIG. 3, those bores are fluidly connected by a passage 54 extending through fillet 48. The valve section 36 has a valve chamber 56 containing the rotary valve 58. Chamber 56 is connected by passage 60 to the same portion of bore 52 to which passage 54 is connected. The valve 58 is mounted in chamber 56 on a rotatable valve shaft 62 which extends out of the valve section housing 64. A valve control arm 66 is connected to the outside end of shaft 62 and is pivotally connected at 68 to the valve push rod link 26.

Referring now to FIG. 4, the section illustrated extends in a plane passing through the axis 44 of parallel section 32 and also extends through a plane perpendicular to valve axis 46 and through the center of the valve section 36. The valve section has a power fluid inlet 70 and a power fluid outlet 72 which are circumferentially spaced about the circular valve chamber 56 relative to each other and to the port 74 where passage 60 connects with chamber 56. The valve 58 has a center chamber 76 from which radial passages 78, 80 and 82 extend. These passages respectively open into valve recesses 84, 86 and 88 formed in the valve outer periphery and extending arcuately of the valve for predetermined arcuate distances. As is seen in FIG. 5, recess 84 is triangular in plan view with the point 90 formed by the lateral chamber walls extending toward port 74 but not intersecting that port when the valve is in the brake release position shown. Recess 86 is substantially rectangular in plan view, as seen in FIG. 6, and in the position illustrated fully communicates with inlet port 70 at one end of recess 86. The range of rotary valve movement is such that inlet port 70 always fully communicates with recess 86. FIG. 7 illustrates recess 88 as also being triangular in plan view, with the point 92 formed by the lateral chamber walls being positioned away from port 72 when the valve is in the position illustrated. The narrow base 94 of triangular recess 88 is so positioned that it substantially bisects outlet port 72 when the valve is in the brake release position shown.

The fluid power circuit is illustrated as including a hydraulic pump 96 which is connected on its inlet side by a conduit 98 to a fluid reservoir 100 and on its outlet side by a conduit 102 to inlet port 70. The outlet port 72 is connected by conduit 104 to the power steering gear 106, which is in turn connected by conduit 108 to reservoir 100.

The assembly 10 has a housing 110 from and in which the various sections 30, 32, 34 and 36 are formed. While the housing is illustrated as being of single casting for simplicity of illustration, it may be formed of various sections as required for manufacture and assembly. Since the parallel sections 30 and 32 are quite similar only section 32 will be described in further detail. This section is well illustrated in FIG. 4.

Bore 52 has a reaction chamber 112 in the rearward end of the bore, a power chamber 114 in a central portion of the bore and separated from chamber 112 by a wall 116, and a master cylinder pressurizing chamber 118 in the bore forward end. An outlet port 120 connects with brake circuit 22. A piston assembly 122 is reciprocably received in bore 52 forward of wall 116 and separates that portion of the bore into chambers 114 and 118. The piston assembly is illustrated as having a power piston 124 on its rear end and defining a movable wall of chamber 114. The piston assembly has a master cylinder pressurizing piston 126 formed on its forward end and defining the movable wall of chamber 118. These two pistons are joined by a reduced diameter section 128. A cup seal 130 is positioned on the forward face of piston 126 and is held in place by the piston return spring 132. This spring is a compression spring located in chamber 118 and yields during pressurizing movement of piston 126. A compensation port 134 connects chamber 118 with the portion 136 of the reservoir section 34 which contains hydraulic fluid for the brake circuit 22. The stop pin 138 is provided for assembly purposes.

The reaction chamber 112 has a reaction piston 140 reciprocably received therein and urged by spring 144 against the plug 142 which closes the rear end of chamber 112. A plunger 146, which is a forwardly extending part of piston 140, extends through an opening 148 in wall 116 so that it is exposed to pressure in power chamber 114. The plunger is in force transmitting engageable relation with power piston 124 and in the released position of the assembly provides a stop for piston assembly 122. It also establishes the limit of rearward movement of piston 124 so that passage 60 is always fully open to chamber 114. Plug 142 has an opening 150 through which push rod arm 40 freely extends into engagement with a socket formed in the rear face of piston 140.

In the release position shown, the brake circuit 22 is relieved of pressure through compensation port 134. The piston return spring 132 urges the piston assembly 122 against plunger 146, which with its piston 140 is positioned against the forward end of plug 142 by spring 144. Thus the brake pedal arm 24 is held in the brake release position. Therefore push rod 26 has positioned rotary valve 58 in the position shown in FIG. 4. With pump 96 running, power fluid is transmitted at a low pressure and relatively free flow through conduit 102 and the valve section 36, out through conduit 104 to the power steering gear 106, and then to the reservoir 100 through conduit 108. The flow through the valve section is through inlet port 70, recess 86, passage 80, chamber 76, passage 82, recess 88, and outlet port 72. Fluid is also maintained in passage 78 and recess 84. However the point 90 of recess 84 is not positioned to connect with passage 60 and therefore no fluid passes from the valve chamber 56 to the power chamber 114.

During normal brake actuation the vehicle operator pivots the brake lever arm 24 clockwise as seen in FIG. 4, imparting rotary movement to valve 58 and linear movement to arm 40. The slight rotary movement initially obtained moves the point 90 of recess 84 into communication with port 74. At the same time recess 88 moves to initially fully open outlet port 72, after which further rotary movement of valve 58 will restrict port 72 due to the tapered or triangular shape of recess 88. The directions of valve movement are illustrated by a counterclockwise indicating arrow 152 in FIG. 4, arrow 154 of FIG. 5, arrow 156 of FIG. 6 and arrow 158 of FIG. 7. It can be seen that brake apply movement of the pedal arm 24 results in further restriction of outlet port 72, causing a build-up in pressure in passage 82, chamber 76, passages 78 and 80, recesses 84 and 86 and inlet port 70. Since recess 84 is in fluid communication with power chamber 114 through port 74 and passage 60, the increase in pressure also is obtained in chamber 114. This pressure acts on power piston 124 to move the piston 126 leftwardly against the force of return spring 132. Cup 130 closes off compensation port 134 and the brake fluid in chamber 118 is then pressurized and transmitted to brakes 18 and 20 of brake circuit 82. The modulating action of recess 88 in relation to outlet port 72 as the brake is further actuated increases the power pressure in accordance with the amount of braking desired by the operator as expressed by brake pedal arm movement. The pressure in power chamber 114 also acts against the relatively small area of plunger 146 to generate a reaction force which is transmitted through the push rod link 28 to the brake pedal arm 24, thereby giving a proportionate feel to the operator.

When the operator desires to either reduce brake force or release it entirely, he permits the brake pedal arm 24 to be moved counterclockwise as seen in FIG. 4. The reaction force transmitted by plunger 146 and the force of spring 144 operate to move the pedal arm arcuately counterclockwise. This causes the valve 58 to be rotated angularly clockwise, opening the effective area of outlet port 72 to a greater extent and thereby decreasing the power pressure in chamber 114. Piston assembly 122 is therefore moved rightwardly by the action of brake pressure in chamber 118 and the force of spring 132. The various elements of the system are therefore returned to the release position as shown in FIGS. 4 through 7.

By the use of the rotary valve arrangement, a relatively small arcuate amount of valve movement can be used to modulate the power pressure and therefore the amount of brake actuation through the entire range of pressures. At the same time the valve has no areas exposed to a differential pressure and acting thereon to tend to move the valve in either direction. By arranging the axes of the assembly section 30, 32 and 36 in the relative relations described, linear movement of linearly operable elements and rotary movement of the valve element are obtained by the same controlling movements of the brake lever arm 24 and the push rods 26 and 28.

If there is no power pressure available at inlet port 70 when the brakes are actuated, the arm 40 of push rod link 28 will transmit the manually generated force directly to piston 140 and its plunger 146. The plunger engages piston 124 and further movement moves the piston assembly 122 leftwardly to pressurize fluid in chamber 118. Thus the assembly is always in a condition to operate manually if needed. This operation can occur at any time there is insufficient pressure available in power chamber 114 to move the piston assembly 122 a sufficient distance to obtain the desired brake apply pressure in chamber 118.

What is claimed is:

1. A booster and master cylinder assembly comprising:
    a housing having axially extending bore means therein, first piston means reciprocably received in said bore means and defining therewith fluid pressurizing chamber means;
    second piston means reciprocably received in said bore means in force transmitting relation with said first piston means and defining with said bore means fluid power chamber means;
    said housing further having a cylindrical valve chamber formed therein with the axis thereof skew to said axially extending bore means, a power pressure inlet port and an outlet port and a fluid passage communicating with said cylindrical valve chamber in circumferentially spaced relation, said fluid passage also communicating with said fluid power chamber means;
    and a rotary valve member mounted in said valve chamber for controlled rotational movement about the chamber axis to selectively and controllably fluid connect said passage to one of or neither of said ports to deliver and modulate and remove power pressure to and from said fluid power chamber means to move said second piston means and said first piston means to selectively pressurize and modulate and reduce fluid pressure in said fluid pressurizing chamber means;
    said valve member having an axially extending chamber positioned centrally thereof; circumferentially spaced peripheral chamber walls cooperating with said valve chamber to define first, second, and third peripherally spaced chambers respectively associated with said inlet port, said outlet port, and said fluid passage; and first, second and third valve passages therein respectively providing continuous fluid communication between said axially extending chamber and said first, second and third peripherally spaced chambers; the lateral chamber walls of said second and third peripherally spaced chamber converging to define said second and third peripherally spaced chambers as variable restrictions to fluid flow therethrough with rotary valve movements in the brake apply and release directions modifying the restrictions to fluid flow in cooperation with said outlet port and said fluid passage.

2. A power booster and master cylinder assembly comprising:
    a pair of axially parallel bores formed in a housing, each of said bores having reciprocably received therein a piston unit having a power piston face on one end and a master cylinder pressurizing piston face on the other end, said bores and said piston units defining power pressure chambers and fluid pressurizing chambers;
    a reaction and manual apply plunger extending into each of said power pressure chambers and engageable with said piston units;
    a rotary control valve in a valve chamber formed in the housing and having a valve axis of rotation extending perpendicularly skew to and under said bores, said valve having a control lever extending from said housing, said valve being fluid connected to control power pressure into and out of said power pressure chambers; and first and second push rod means extending generally in the axial direction of said bores and pivotally secured to a brake control arm for actuation thereby, said first push rod means engaging said reaction and manual apply plungers and said second push rod means engaging said valve control lever for controlling movement of said valve by movement of the brake control arm.

3. A power brake assembly comprising:
    housing means having formed therein a first bore and a second bore and a valve chamber,
    first and second piston means respectively received in said first and second bores and defining therewith first and second power chambers and first and second brake fluid pressurizing chambers;
    first and second reaction plungers respectively in said first and second bores and extending into said first and second power chambers and having manually operated push rod means,
    rotary valve means in said valve chamber rotatable on an axis transverse and skew to the axes of said bores and having an actuating lever and a valve push rod connected to said lever whereby substantially linear movement of said valve push rod rotates said valve means in said valve chamber,
    and a rotary valve in said valve chamber for controlled rotational movement about said chamber axis to selectively and controllably fluid connect said passage to one of or neither of said ports to control actuation and deactuation of said second piston means to drive said first piston means to selectively pressurize fluid in said fluid pressurizing chamber means.

* * * * *